INVENTORS
CLARK E. JOHNSON, JR.
ROGER D. FOSKETT
BY
ATTORNEY

_United States Patent Office_

3,495,452
Patented Feb. 17, 1970

3,495,452
TORQUE METER
Clark E. Johnson, Jr., Weston, and Roger D. Foskett, Winchester, Mass., assignors to Vibrac Corporation, Chelmsford, Mass., a corporation of Massachusetts
Filed July 21, 1967, Ser. No. 655,014
Int. Cl. G01l 3/02
U.S. Cl. 73—136                         20 Claims

ABSTRACT OF THE DISCLOSURE

An electro-optical torque measuring device comprising a pair of matched discs each having a series of transparent and opaque areas mounted on a torque shaft, means for illuminating the discs, and photosensitive means for providing an electrical signal that varies in accordance with changes in the amount of light passing through the two discs as a result of torsional deflection to the shaft. The discs are arranged so that at zero torque the transparent areas of one disc are partially blocked by the opaque areas of the other disc. The device also includes means for calibrating for a given torque range and zeroing means adapted to compensate for lamp aging or change in input lamp voltage.

---

This invention relates to the art of measuring torsion and more particularly to a torque measuring device adapted to provide an electrical signal output which is a function of an applied torsional load.

A primary object of this invention is to improve upon torque measuring devices of the type described in U.S. Patent No. 2,136,223 issued Nov. 8, 1938 to A. A. Thomas for "Torsion Indicator" and U.S. Patent No. 3,111,028 issued Nov. 13, 1963 to M. J. Lebow for "Torquemeter." Such devices essentially comprise a pair of discs located on a common shaft so that one will rotate relative to the other according to torsional deflection of the shaft. Each disc has one or more light transmitting segments and the discs are so arranged that upon relative rotation the segments of one disc will move into or out of alignment with the segments of the other disc. Such devices further include means for directing light at the segments of one disc and photosensitive means for detecting variations in the amount of light passing through the segments of the other disc as a result of relative rotation of the discs. Heretofore, torque meters of the type described above have been limited in their applications because of a number of problems, notably poor linearity and first and higher order harmonic fluctuations in signal output due to shaft runout (i.e. radial shaft eccentricity) and/or slight variation in the sizes, spacing and/or radial alignment of the light transmissive segments of one disc relative to those of the other disc. Such undesired signal fluctuations are particularly bad at low speeds. Other limitations are relatively high cost of manufacture and assembly of parts, inability to calibrate quickly, need for amplification of output signal, inability to compensate directly for changes in light intensity due to lamp aging or supply voltage fluctuations, excessive size, and difficulty in replacing light sources. Furthermore, most prior torque meters are designed to measure either dynamic or reaction torque and are not adapted to be readily converted from one to the other mode of operation. Accordingly, a more specific object of the invention is to provide a torque meter which eliminates or substantially reduces the specific limitation and problems noted above inherent with past devices.

Briefly speaking the present invention contemplates the use of two discs wherein one is exactly the reverse of the other, one constituting a negative image and the other constituting a positive image of essentially the same geometric pattern. As hereinafter described, one disc is made from the other so that any error in the size, spacing, shape or definition of a particular portion of the geometric pattern occurring on one disc is duplicated on the other disc. The invention further contemplates the use of two discrete light sources positioned to direct light at two separate photosensitive detectors, with the light sources and detectors disposed so as to minimize runout error. The light soruces are mounted so as to be easily replaceable without dismantling of the device. Another feature is provision of means for locking one end of the shaft so as to permit reaction torque measurements. The invention further contemplates and embodies a signal generating circuit comprising means for calibrating for a given torque range and separate zeroing means adapted to compensate for lamp aging or changes in input lamp voltage.

Other features, objects and advantages of the invention are described in or renderd obvious by the following detailed specification which is to be considered together with the accompanying drawings, in which.

Figure 1:
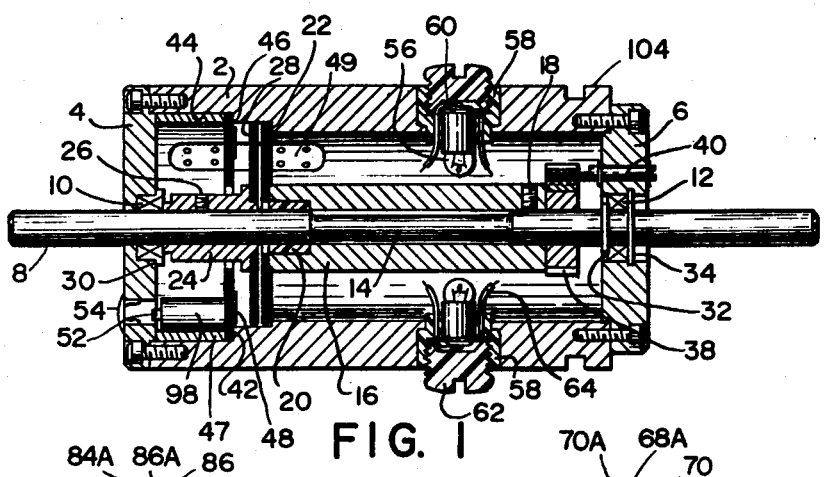
FIG. 1 is a longitudinal sectional view in elevation of a preferred embodiment of the invention.

Referring now to FIG. 1 the preferred embodiment of the invention includes a housing consisting of a cylindrical case 2 closed off at its opposite ends by removable members 4 and 6. Preferably, but not necessarily, the end members 4 and 6 are attached to the case 2 by bolting as shown so as to facilitate assembly and disassembly. End members 4 and 6 are provided with aligned center holes in which a torque shaft 8 is supported by means of suitable bearings 10 and 12. Intermediate its ends the torque shaft 8 includes a reduced diameter portion 14. The cross-sectional area of reduced diameter portion 14 and the length thereof determines the torque range of the device.

Mounted on the torque shaft is a sleeve 16. Sleeve 16 surrounds the reduced diameter portion 14 and one end thereof is secured to the torque shaft 8 by a set screw 18. The opposite end has an enlarged internal diameter to accommodate a bearing 20. Attached to this same end of sleeve 16 is a disc 22, details of which are described below. Also mounted on shaft 8 is a second substantially shorter sleeve 24. Sleeve 24 is secured to shaft 8 by a set screw 26. Attached to the sleeve 24 is a second disc 28, details of which are also described below. Discs 22 and 28 are preferably cemented to the end sides of sleeves 16 and 24. However, as an alternative measure they may be secured to sleeves 16 and 24 by screws or other suitable fastening means. The two sleeves 16 and 24 support discs 22 and 28 in parallel, closely spaced relation to each other, with the gap between them preferably in the order of a sixteenth of an inch or less.

Although not shown in detail, it is to be understood that bearings 10 and 12 are of the roller or ball bearing type and comprise inner and outer races separated by rollers or balls. The outer race of the bearing 10 is provided with a flange 30 which engages the inner face of end member 4. This flange is maintained in contact with the end member 4 under the pressure exerted by sleeve 24 on the inner race of bearing 10. Axial movement of shaft 8 away from end member 4 is prevented by a snap-type retainer ring 32 that is locked in a groove in shaft 8 and bears against the inner race of bearing 12. Bearing 12 is held in place by means of a second snap-type retainer ring 34 that is locked to end member 6 and engages the outer race of the bearing. With this arrangement, shaft 8 is capable of rotating relative to the housing, and the discs 22 and 28 rotate with the shaft. In practice one end of torque shaft 8 is coupled to a drive means capable of applying thereto rotational mechanical power supplied by a suitable power source, e.g., an electric motor. The opposite end of torque shaft 8 is generally coupled to an energy absorbing or converting device (not shown) such that torque applied by the drive means is transmitted by way of the torsionally deformable torque shaft 8. As power is transmitted, the torque shaft 8 is torsionally deformed so that there is a relative angular displacement between the two ends of the shaft. Since discs 22 and 28 are effectively coupled to the shaft 8 by sleeves 16 and 24, and since the points of attachment of sleeves 16 and 24 with the torque shaft are at opposite ends of the reduced diameter portion 14, the two discs will rotate relative to each other according to the torsional deformation of the shaft. At this point it is to be appreciated that to the extent described, the device of FIG. 1 is adapted for dynamic torsional load measurements. However, it is also adapted for reaction torque measurements. For the latter purpose means are provided for locking one end of the torque shaft 8 to the housing so that it cannot rotate relative to the housing. Such means are illustrated in FIG. 1 and essentially comprise a gear 38 affixed to shaft 8 and a pin 40 that screws into end member 6. The pin 40 is long enough to project between two of the teeth of gear 38 and makes a snug fit with the gear so as to effectively lock it and the adjacent end of shaft 8 against rotation relative to the case.

Also forming part of the device of FIG. 1 is a printed circuit board 42. The case 2 is counterbored as shown at 44 so as to provide a shoulder 46 against which the printed circuit board 42 can be held. The latter is held against the shoulder 46 by a cylindrical spacer 47 that is engaged by the inner surface of the end member 4. The shoulder 46 positions the printed circuit board in close spaced relation with the disc 28. The printed circuit board has a center hole sized to accommodate sleeve 24 so that it will rotate freely. The printed circuit board 42 carries some of the components of the circuit shown in FIG. 4. Among these components are two photosensitive units illustrated schematically at 48 in FIG. 1. These photosensitive units 48 are mounted in diametrically opposed relation with each other and are identical. Although not shown it is to be understood that the printed circuit board 42 has conductive terminal portions on one side thereof which are coupled by flexible leads to a multi-pin connector 49 mounted in a suitable aperture in the wall of case 2.

The printed circuit board also carries a miniature rotary-type variable resistor 98 having an adjustment screw 52. This variable resistor is hidden behind end member 4 but access to its adjustment screw is afforded by an opening in the end member which is normally closed off by a removeable spring clip plug 54.

The light sources of the device of FIG. 1 comprise two miniature bulbs 56 which preferably are of the type used in flashlights. These are mounted in plastic bushings 58 press-fitted in two aligned diametrically opposed holes in case 2. The bulbs are inserted into the bushings from the outside. Each bulb has a flange 60 which engages the inner surface of the bushing and thus limits the extent to which the bulb can project into the case. The bulbs are held in place by plugs 62 that screw into the bushings.

Each bushing is fitted with two insulated lead wires 64 which are connected to the terminals of the bulb. The opposite ends of these lead wires are connected to appropriate terminals of connector 49.

Figure 2:
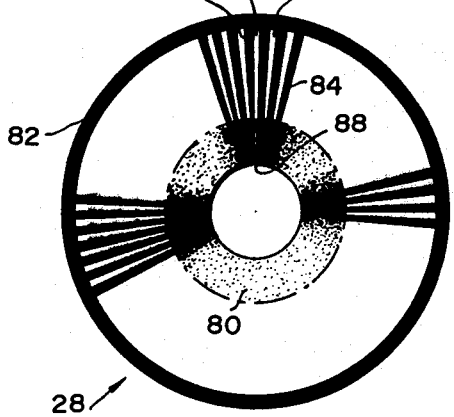
FIG. 2 is an enlarged illustration of one of the two discs embodied in the device of FIG. 1.
Figure 3:
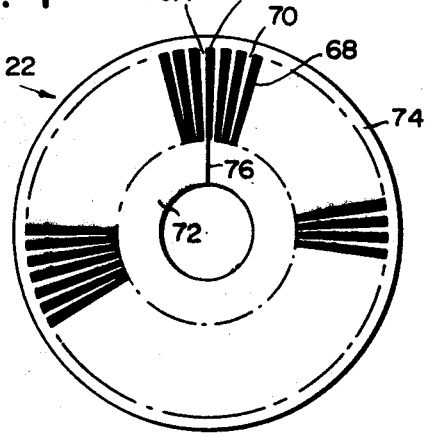
FIG. 3 is an enlarged illustration of the other disc embodied in the device of FIG. 1.

Referring now to FIGS. 2 and 3 it is important to note that the disc 22 comprises a circular concentric array of alternately occurring radially-extending opaque and transparent sectors 68 and 70 (for convenience of illustration, only a few are shown) which surround a wide transparent band 72 and are surrounded by a thin transparent band 74. The opaque sectors 68 are identical with each other in length and width, each sector increasing in width with increasing distance from the center of the disc. The transparent sectors 70 also are identical to each other, having the same length and width with the width increasing with increasing distance from the center of the disc. Preferably the opaque sectors 68 have exactly the same width as the transparent sectors 70, but if desired the opaque sectors 68 may have a greater or smaller width than the transparent sectors 70. The band 72 is interrupted by a single opaque sector 76 which extends radially toward one of the opaque sectors 68A but is aligned so that one edge thereof coincides with the boundary between opaque sector 68A and the adjacent transparent sector 70A.

The other disc 28 is the exact reverse of the disc 24. It consists of inner and outer opaque circular bands 80 and 82 that have the same inner and outer diameters as transparent bands 72 and 74 respectively. Between bands 80 and 82 is an array of alternately occurring opaque and transparent sectors 84 and 86. The inner opaque band 80 is interrupted by a single transparent sector 88 which extends radially in line with a transparent sector 86A but is disposed so that one edge thereof coincides with the boundary between the transparent sector 86A and an adjacent opaque sector 84A. In practice the discs 22 and 28 are manufactured by preparing a drawing of the desired pattern, e.g. the pattern shown in FIG. 3. This drawing is then projected onto a glass disc coated with a photographic emulsion. The resulting latent image is then developed and fixed with the result that the disc provides a negative image of the pattern to which it has been exposed. This disc is the one shown in FIG. 2. Once the disc has been made, it is placed on top of a second disc having a photographic emulsion, and the emulsion of the second disc is exposed to light projected through the first disc. The second disc is then photographically processed with the result that it presents a positive image of the pattern. This second disc is the one shown in FIG. 3. Alternatively, the process could start with a drawing of the pattern of FIG. 2, in which case the first disc produced would be that of FIG. 3 and the second disc would be that of FIG. 2. Of course, the disc need not be made by the process outlined above but could be made by other processes known to persons skilled in the art. Thus, the first disc could be made by incremental exposure of its emulsion using apparatus similar to a dividing engine. However, regardless of the process used to make the first disc, the second disc is always made directly from the first disc so that the pattern inscribed on the former is the reverse image of the pattern inscribed on the latter. Making one disc from the other assures that any irregularities or imperfections in the pattern on the first disc are carried over onto the second disc. Thus, for example, if the transparent sectors of the first disc are not all the same width or have ragged or imperfect edges, the same thing will be true of the second disc. The single segments 76 and 88 facilitate alignment of the two discs when they are mounted on the sleeves 16 and 24 so that the imperfections of one disc are substantially in line with and thus can effectively cancel out the corresponding imperfections on the other disc.

Figure 4:
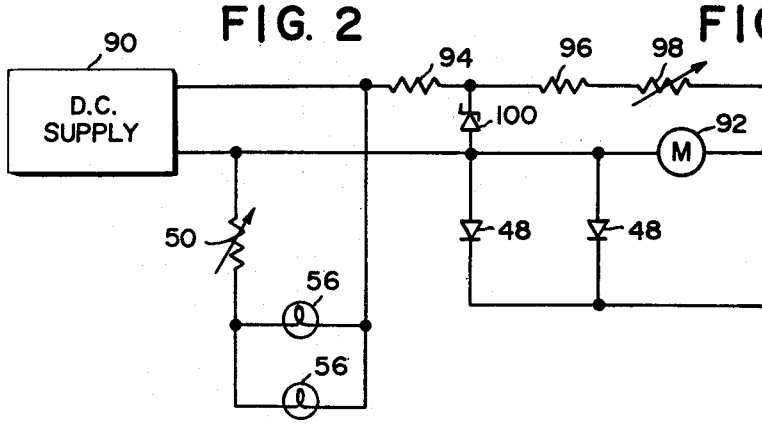
FIG. 4 is a schematic diagram of the circuit for the device of FIG. 1.

FIG. 4 illustrates the circuit embodied in the device of FIG. 1. The circuit, which is coupled to a regulated D.C. power supply 90 via the connector 49, includes a conventional center reading microammeter 92. In a preferred embodiment of the device the power supply has an output of 28 volts D.C. and meter 92 has a range of 100 microamps on each side of its center or zero position. The terminals of meter 92 are connected to the D.C. power supply by two fixed resistors 94 and 96 and variable resistance 98. Connected between the D.C. supply and meter 92 on the one hand and the junction of resistors 94 and 96 on the other hand is a Zener diode 100. Connected in parallel between the two sides of the meter are the two photosensitive units 48, which in practice take the form of silicon solar cells. Also connected in parallel across the D.C. supply 90 are the two light bulbs 56. The circuit for light bulbs 56 includes a variable resistor 50. The variable resistor 50 may be mounted on the printed circuit board together with fixed resistors 94 and 96, variable resistor 98, Zener 100, and solar cells 48, but preferably it forms part of the D.C. power supply 90.

The Zener functions as a constant voltage source with respect to meter 92. The constant voltage established by the Zener provides a constant current flowing through the meter in one direction, with the magnitude of the constant current depending upon the value of resistor 96 and the setting of variable resistor 98. Opposing this current is a second current supplied by the solar cells 48. The magnitude of this latter current varies according to the amount of light to which the solar cells are exposed.

In practice the two discs 22 and 28 are mounted so that (a) segments 76 and 88 are at substantially the same angular position with respect to the torque shaft, and (b) each opaque segment 68 of disc 22 interferes with and blocks exactly half of one of the transparent segments 86 of disc 28. With this arrangement, the amount of light impinging upon the solar cells at zero torque will be approximately half of what is received when the transparent segments 70 are exactly aligned with transparent segments 86. Hence at zero torque the solar cell output is approximately halfway between maximum and minimum operating limits. This enables the device to operate in either direction. Regardless of which way the shaft is rotated, torsional deflection thereof produces a relative rotation of the discs, which in turn results in a change in the magnitude of the solar cell current; the solar cells provide a greater current when the relative rotation is such as to reduce light interference and a smaller current when the relative rotation is such as to increase light interference. Since the meter is of the center reading type, it will provide an indication of applied torque regardless of which way the shaft is torsionally deflected. Of course, the scale of the meter is calibrated so as to directly indicate torque.

In practice the setting of resistor 98 is established at the time of manufacture of the device, the value of the resistance provided by resistor 98 serving to calibrate the unit to its effective torque range. The other variable resistor 50 functions to zero the instrument by adjusting the intensity of the light emitted by bulbs 56. In this connection it is to be noted that a change in lamp intensity due to filament aging or a drop or increase in the output of D.C. supply 90 will produce a shift in the position of the meter needle at zero torque condition. A change in solar cell sensitivity also will change the no-load output of the meter. It will be apparent that the curve relating torque to the solar cell output current, which is essentially linear within the selected operating limits of the device, undergoes a change in slope with a shift in lamp intensity or solar cell sensitivity at zero torque. The slope of the aforesaid curve may be determined by two points. One of these points may be the condition of zero light intensity at which the output from the solar cells is also zero. The other point may be the condition of zero torque. By modifying the setting of the variable resistor 50 it is possible to adjust the incident light intensity so that the solar cell output under conditions of zero torque is equal to the output from the constant current Zener diode circuit. In this way it is possible to restore the original slope so that the curve again extends through the same two points, thus assuring that the meter readings will be accurate over the torque range for which its dial is calibrated.

A torque meter constructed as above described and illustrated offers a number of material advantages, many of which are unattainable by practicing the prior art. Irregularities in the patterns on the optical discs are unavoidable and prior art devices have suffered from the presence of such irregularities or else it has been necessary to manufacture the discs to a fine tolerance, but at a substantial increase in cost. Applicants' optical disc assembly, because of the method of manufacturing the discs one from the other and because of the way the discs are mounted with respect to each other, assures that irregularities in the pattern of one are substantially cancelled out by corresponding irregularities in the pattern of the other. The size and number of segments on the two discs is not critical and may be varied substantially. Eccentricity of the discs is overcome by mounting the two photocell units in diametrically opposed relation to each other. The two light sources are aligned with the two solar cells for proper light balance and are located sufficiently far from the optical discs to avoid the need for collimating elements.

Further advantages reside in the mode of assembly of the device. It is believed to be apparent that except for bulbs 56, the mechanical elements of the unit of FIG. 1 can all be inserted into the case from the left hand end. Furthermore, the device lends itself to quick and easy disassembly for inspection and repair of parts. Removal of the printed circuit board can be effected without removing the torque shaft or the optical discs from the case. The same is true of the two light bulbs which are individually removeable. The case is easily provided with brackets for attaching it to a rigid support and in the illustrated embodiment the case is provided with a peripheral flange as shown at 104 for attachment to a supporting structure by a suitable clamp ring, e.g., clamp rings of the type conventionally used to couple together potentiometers. Conversion of the instrument from dynamic to reaction torque measurements or vice versa is easily effected by moving the pin 40 into or out of engagement with gear 38.

Further advantages reside in the electrical circuit of the device. The variable resistor 50 permits compensating for reduced lamp intensity due to aging or variations in supply voltage, and also for variations in solar cell sensitivity because of aging. Having in mind the fact that the torque range of the device can be modified by varying the cross-sectional size of the reduced diameter portion 14 of the torque shaft, the instrument can be calibrated for whatever torque range is selected merely by adjusting the variable resistor and changing the dial on the meter. Connecting the two solar cells in parallel rather than in series also is important. The conversion efficiency of silicon solar cells is quite good and a pair of cells of the same type tend to exhibit essentially the same short circuit characteristics. However, the shunt resistance will vary substantially from one cell to another and such variation would have a greater disturbing effect on the circuit if the cells were connected in series rather than in parallel. The circuit is relatively simple and inexpensive to produce, yet with state of the art components, it lends itself to high reliability and provides an accuracy of measurement to within ±0.2%.

We claim:

1. In a device for providing an electrical signal having a magnitude which varies in accordance with the magnitude of the torque applied to a rotatable shaft and comprising a rotatable shaft, a pair of discs mounted on said shaft so that they will undergo rotational displacement with respect to one another in response to torsional deflection of said shaft, each disc having a light dividing pattern comprising a series of alternately occurring light-transmitting and opaque areas arranged in an array about said shaft, means on one side of said discs for illuminating said discs, and photosensitive light detecting means on the opposite side of said discs for providing an electrical signal that varies in response to the amount of light passing through both of said discs, the improvement wherein the light dividing pattern of one disc constitutes the substantially exact inverse photographic image of the light dividing pattern of the other disc.

2. Apparatus as defined by claim 1 wherein all irregularities, if any, in the pattern on one disc are substantially inversely duplicated in the pattern on the other disc.

3. Apparatus as defined by claim 1 wherein said means for illuminating said discs comprises two light sources displaced 180° from one another about the axis of said shaft, and said photosensitive light detecting means comprises two photosensitive elements aligned with said two light sources.

4. Apparatus as defined by claim 3 wherein said two photosensitive elements are photovoltaic and are connected in parallel.

5. Apparatus as defined by claim 3 wherein said two photosensitive elements are connected together.

6. Apparatus as defined by claim 1 further including means coupled to said photosensitive elements for converting said electrical signal to an indication of the magnitude of the torque applied to said shaft.

7. Apparatus as defined in claim 1 wherein with no torque applied to said shaft each of the transparent segments of one disc is partially blocked against light transmission by an opaque segment of the other disc.

8. Apparatus for measuring torque comprising a shaft to which the torque to be measured is applied, a pair of discs mounted on said shaft so as to be rotationally displaced with respect to one another in proportion to the torsional deflection of said shaft, each disc having a series of alternately occurring light transmitting and opaque segments arranged about the axis of said shaft, a pair of electrically energizable light sources on one side of said disc, a pair of photosensitive detectors on the opposite side of said discs in substantial alignment with said light sources, the amount of light passing through said discs and hence the signal generated by said detectors being proportional to the torque applied to said shaft, a power supply, means connected to said power supply for delivering an energizing current to said light sources, a meter, a means for applying the combined signal generated by said detectors to said meter, means for applying a second signal to said meter in opposition to the signal generated by said detectors, said second signal having a magnitude sufficient to substantially balance the combined signal output of said detectors when no torque is applied to said shaft, and means for varying the current supplied to said light sources to vary the light output thereof.

9. Apparatus as defined by claim 8 further including a housing, means rotatably supporting said shaft in said housing, and means releasably locking one end of said shaft to said housing.

10. Apparatus as defined by claim 8 further including a housing for said shaft and said discs, said housing comprising a side wall surrounding said shaft and discs and opposite end members in which said shaft is rotatably supported, said light sources being mounted in said side wall and being removeable through said side wall.

11. Apparatus as defined by claim 8 wherein with no torque applied to said shaft each of the transparent segments of one disc is partially blocked against light transmission by an opaque segment of the other disc.

12. Apparatus as defined by claim 11 wherein with no torque applied to said shaft about one half of the area of each of the light-transmitting segments of one disc is blocked against light transmission by an opaque segment of the other disc.

13. Apparatus for measuring torque comprising a shaft to which the torque to be measured is applied, a pair of discs mounted on said shaft so as to be rotationally displaced with respect to one another proportionally in response to torsional deflection of said shaft, a housing comprising a side wall surrounding said discs and opposite end walls in which said shaft is rotatably mounted, each disc having a series of alternately occurring opaque and light transmitting segments arranged about the axis of said shaft, a pair of electrically energizable light sources mounted in said side wall to one side of said discs, a pair of photovoltaic cells disposed in the opposite side of said discs in position to receive light passing through said discs from said light sources, the amount of light passing through said discs and illuminating said cells being proportional to the relative rotation of said discs resulting from torsional deflection of said shaft, a meter, means connecting said photovoltaic cells to said meter so that said cells produce a first unidirectional current through said meter that varies in accordance with the amount of light passing through said discs, a power supply, means for delivering electrical current to said light sources from said power supply, means for generating from said power supply a second unidirectional current through said meter in opposition to said first current, and means for adjusting the magnitude of the current supplied to said light sources.

14. Apparatus as defined by claim 13 wherein said means for generating said second unidirectional current comprises a substantially constant current source.

15. Apparatus as defined by claim 14 wherein said means for generating said second unidirectional current also includes means for varying the magnitude of said second unidirectional current.

16. Apparatus as defined by claim 13 wherein said cells are connected in paralel between the input terminals of said meter, and further wherein said means for generating said second unidirectional current comprises a Zener diode connected across the output terminals of said power supply, and means including a variable resistor connecting said Zener diode between the input terminals of said meter.

17. A device for providing an electrical signal having a magnitude which varies in accordance with the magnitude of the torque applied to a rotatable shaft and comprising said rotatable shaft, a pair of discs mounted on said shaft so that they will undergo rotational displacement with respect to one another in response to torsional deflection of said shaft, each disc providing a series of alternately occurring relatively high light transmitting areas and relatively low light transmitting areas arranged in an array about said shaft, said discs disposed so that at zero torque about half of each of the relatively high light transmitting areas of one disc is aligned with one of the relatively low light transmitting areas of the other disc, means on one side of said discs for illuminating said discs, and means including photosensitive light detecting means on the opposite side of said discs for providing an electrical signal that varies in response to the amount of light passing through both of said discs.

18. Apparatus for measuring torque comprising a shaft to which the torque to be measured is applied, a pair of discs mounted on said shaft so as to be rotationally displaced with respect to one another proportionally in response to torsional deflection of said shaft, a housing comprising a side wall surrounding said discs and opposite end walls in which said shaft is rotatably mounted, each disc having a series of alternatively occurring areas of relatively high and relatively low light transmissibility arranged about the axis of said shaft, at least one light source mounted in said housing to one side of said discs, at least one photosensitive detector adapted to generate a first unidirectional current that varies according to the amount of light detected thereby, said at least one photosensitive detector mounted in position to receive light passing through said discs from said at least one light source with the amount of light passing through said discs and received by said at least one photosensitive detector proportional to the relative rotation of said discs resulting from torsional deflection of said shaft, a meter, means for applying said first current to said meter, means for generating a second unidirectional current and applying said second current to said meter in opposition to said first current, and means for adjusting the relative magnitudes of said first and second currents.

19. Apparatus as defined by claim 18 wherein said means for generating said second unidirectional current also includes means for varying the magnitude of said second unidirectional current.

20. Apparatus according to claim 18 wherein said at least one light source is electrically energizeable, and further including means for supplying electrical current to said at least one light source and means for varying the magnitude of the current supplied to said at least one light source.

References Cited
UNITED STATES PATENTS

| | | | |
|---|---|---|---|
| 2,586,540 | 2/1952 | Holden | 73—136 |
| 2,938,378 | 5/1960 | Canada et al. | 73—136 |
| 3,111,028 | 11/1963 | Lebow | 73—136 |
| 3,145,250 | 8/1964 | Vargady | 356—169 |

OTHER REFERENCES

Peterson: IBM Technical Disclosure Bulletin, vol. 1, No. 5, February 1959, pp. 33–34.

CHARLES A. RUEHL, Primary Examiner

U.S. Cl. X.R.

250—231; 356—169